Patented July 23, 1940

2,208,960

UNITED STATES PATENT OFFICE 2,208,960

2-CHLOROALLYL ESTERS OF SATURATED MONO-CARBOXYLIC ACIDS

Gerald H. Coleman and Bartholdt C. Hadler, Midland, Mich., assignors to The Dow Chemical Company, Midland, Mich., a corporation of Michigan No Drawing. Application December 14, 1938, Serial No. 245,622

5 Claims. (Cl. 260—410)

This invention concerns the esters of 2-chloroallyl alcohol with certain saturated mono-carboxylic acids containing four or more carbon atoms. All such esters are new compounds useful as intermediates in the preparation of a variety of other organic chemicals, and the higher molecular weight products, i. e. the 2-chloroallyl esters of long-chain acids, possess unique lubricating properties. They vary in physical properties from high-boiling liquids to crystalline or amorphous solids, and are soluble in a number of organic solvents, such as benzene, carbon tetrachloride, ethanol, diethyl ether, etc.

The acids which may be employed in preparing the new esters of 2-chlorallyl alcohol include the saturated aliphatic mono-carboxylic acids containing four or more carbon atoms, e. g. n-butyric acid, iso-butyric acid, n-valeric acid, methylethylacetic acid, trimethylacetic acid, pelargonic acid, capric acid, palmitic acid, etc., and the cycloaliphatic mono-carboxylic acids such as are found in crude petroleum and commonly known as naphthenic acids. Mixtures of such acids may also be employed.

The new esters are usually prepared by reacting 2-chloroallyl alcohol with one of the above-mentioned acids, although, if desired, the corresponding acid chloride or anhydride may be employed. The esterification is preferably carried out by heating 2-chloroallyl alcohol with approximately one molecular equivalent of the acid at a temperature of approximately 50°–150° C. in the presence of a small proportion of an esterification catalyst, such as sulphuric or benzene sulphonic acid. Water is formed in the reaction and, if desired, a water-immiscible organic solvent, such as benzene, toluene, carbon tetrachloride, etc., may be added for the purpose of promoting the vaporization and removal of the water in the form of an azeotropic mixture with the solvent. Upon completion of the reaction, the mixture is treated with sufficient alkali to neutralize the acid contained therein, and the ester product is separated and purified by fractional distillation under reduced pressure or by other appropriate procedure.

The following examples will illustrate several of the ways in which the principle of the invention has been applied, but are not to be construed as limiting the same.

Example 1

A mixture of 88 grams (1.0 mol) of n-butyric acid, 112 grams (1.2 mols) of 2-chloroallyl alcohol, and 2 grams of benzene sulphonic acid was heated at 80°–82° C. for 7 hours in a flask fitted with a dropping funnel, condenser, and a receiver arranged in such manner as to permit distillation of water from the mixture. During the heating, carbon tetrachloride was added dropwise to facilitate the distillation of water from the mixture. Upon completion of the reaction, the mixture was cooled and washed with dilute aqueous sodium bicarbonate and water. The carbon tetrachloride was distilled off and the ester product was purified by fractional distillation under vacuum, whereby 2-chloroallyl n-butyrate was obtained as a colorless mobile liquid having a mild pleasant odor. It distilled at approximately 112°–115° C. under 100 millimeters pressure and had a specific gravity of about 1.050 at 20/4° C. and a refractive index of approximately 1.4444 at 20° C. 2-chloroallyl n-butyrate has the formula:

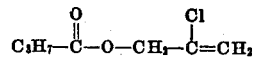

Example 2

A mixture of 200 grams (1.0 mol) of lauric acid, 102 grams (1.1 mols) of 2-chloroallyl alcohol, and 5 grams of benzene sulphonic acid was heated at 83°–89° C. for 2½ hours, during which time benzene was added to facilitate the removal of water as in Example 1. The reacted mixture was washed with dilute sodium bicarbonate solution and water, and the ester product was separated and purified by fractional distillation. There was obtained 234 grams of 2-chloroallyl laurate, a colorless mobile liquid distilling at 120°–125° C. under 3 millimeters pressure and having a specific gravity of about 0.952 at 20/4° C. and a refractive index of approximately 1.4524 at 20° C. 2-chloroallyl laurate has the formula:

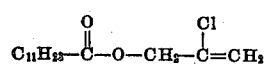

Example 3

A mixture of 284 grams (1.0 mol) of stearic acid, 112 grams (1.2 mols) of 2-chloroallyl alcohol, and 5 grams of benzene sulphonic acid was heated at 84°–88° C. as in Example 1. The reacted mixture was washed and distilled as in Example 1, and the ester product was recovered as a colorless liquid distilling at 180°–185° C. under 3 millimeters pressure. Upon standing for several days at room temperature, the ester solidified to a white crystalline solid having a freezing point of approximately 32° C. 2-chloroallyl stearate has the formula:

$$C_{17}H_{35}-\overset{O}{\underset{\|}{C}}-O-CH_2-\overset{Cl}{\underset{|}{C}}=CH_2$$

*Example 4*

A mixture of 90 grams of 2-chloroallyl alcohol, 5 grams of benzene sulphonic acid, and 206 grams of mixed naphthenic acids obtained from the refining of crude petroleum and having an average neutralization equivalent of 222.5 was heated at 94°–109° C. for 3 hours as in Example 1. The reacted mixture was then washed and fractionally distilled under vacuum whereby there was obtained a mixture of the 2-chloroallyl esters of the various naphthenic acids. The mixed product was a pale-yellow liquid having a specific gravity of about 1.025 at 20/4° C.

Other esters of the present type may be prepared by reacting 2-chloroallyl alcohol with an acid of the type hereinbefore defined. For example, 2-chloroallyl alcohol may be reacted with isovaleric acid in a manner similar to that employed in the above examples to produce 2-chloroallyl isovalerate; with isocaproic acid to produce 2-chloroallyl isocaproate; with n-heptoic acid to produce 2-chloroallyl n-heptoate; with caprylic acid to produce 2-chloroallyl caprylate; with hexahydrobenzoic acid to produce 2-chloroallyl hexahydrobenzoate; with methylcyclopentanoic acid to produce 2-chloroallyl methylcyclopentanoate; with myristic acid to produce 2-chloroallyl myristate; etc.

Other modes of applying the principle of our invention may be employed instead of those explained, change being made as regards the method or materials employed provided the products stated by any of the following claims be obtained.

We, therefore, particularly point out and distinctly claim as our invention:

1. A 2-chloroallyl ester of a saturated mono-carboxylic acid selected from the class consisting of the aliphatic acids containing at least 4 carbon atoms and the naphthenic acids.

2. A 2-chloroallyl ester of a saturated aliphatic mono-carboxylic acid containing at least 4 carbon atoms.

3. A 2-chloroallyl ester of a naphthenic acid.

4. 2-chloroallyl n-butyrate, a colorless mobile liquid distilling at approximately 112°–115° C. under 100 millimeters pressure and having a specific gravity of about 1.050 at 20/4° C. and the formula:

$$C_3H_7-\overset{O}{\underset{\|}{C}}-O-CH_2-\overset{Cl}{\underset{|}{C}}=CH_2$$

5. 2-chloroallyl laurate, a colorless mobile liquid distilling at approximately 120°–125° C. under 3 millimeters pressure and having a specific gravity of about 0.952 at 20/4° C. and the formula:

$$C_{11}H_{23}-\overset{O}{\underset{\|}{C}}-O-CH_2-\overset{Cl}{\underset{|}{C}}=CH_2$$

GERALD H. COLEMAN.
BARTHOLDT C. HADLER.